Figure 1:
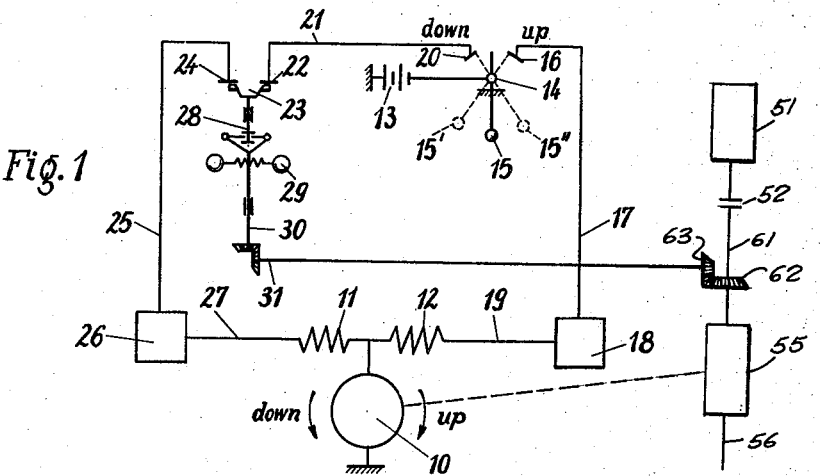

Aug. 11, 1959

E. STUMP 2,898,773

ELECTRIC CONTROL DEVICE, PARTICULARLY
FOR MOTOR VEHICLE TRANSMISSIONS
Filed Dec. 19, 1952

Inventor
Eugen Stump
By Michael and Padlon
Attorneys

United States Patent Office 2,898,773
Patented Aug. 11, 1959

2,898,773

ELECTRIC CONTROL DEVICE, PARTICULARLY FOR MOTOR VEHICLE TRANSMISSIONS

Eugen Stump, Stuttgart-Unterturkheim, Germany, assignor to Daimler-Benz Aktiengesellschaft, Stuttgart-Unterturkheim, Germany Application December 19, 1952, Serial No. 326,969

Claims priority, application Germany December 20, 1951

13 Claims. (Cl. 74—336.5)

The present invention relates to a control device for gear systems, particularly to an electric control device for motor vehicle transmissions, which are, for example, equipped with a motor which shifts the transmission in steps to the next higher or lower speed gear.

An object of the present invention is to avoid a premature shifting to a lower gear so as to protect the engine from damages which may occur as a result of excessive speed of the output shaft of the vehicle at the time when a lower speed gear is to be engaged.

Another object of the present invention is to provide a control device and to arrange the same in an appropriate manner to avoid a premature shifting to a lower gear of the vehicle transmission.

In control devices of this type of the prior art, there always exists the particular danger that the speed of the engine is stepped up or increased too much by the output shaft of the transmission by reason of a premature shifting of the transmission to a lower gear which may then damage the engine. This danger is particularly great in vehicles provided with rear engines as the driver is not able to observe or hear the noises of the engine by listening thereto, as would be the case in forwardly mounted engines.

According to the present invention, the aforementioned disadvantages and dangers are eliminated.

The present invention consists essentially in a device which is operated in dependence of the engine speed or the speed of the transmission input shaft to avoid a shifting down to a lower speed gear when the engine or the transmission input shaft exceeds a predetermined speed.

For this purpose the present invention, which may use a control circuit in connection with an electric motor for shifting the transmission down or up, contemplates a switch arranged in the circuit which effects a shifting down to a lower speed, which switch is opened under the effect of a speed governor so as to prevent operation of the transmission control device in a direction of shifting to a lower gear when the governor exceeds a predetermined speed.

It is particularly suitable to provide for this purpose a small governor, which is driven by the input shaft of the vehicle transmission with a gearing up ratio. Since the governor is driven by the transmission input shaft, its functioning is also assured during that time when the transmission is disengaged from the engine during declutching, since the input shaft of the transmission bears a definite speed ratio to the output shaft in each speed gear of the transmission without being influenced in any way by events taking place outside thereof, such as de- clutching, etc., due to the constant connection within the transmission.

The present invention further contemplates to arrange the electric switch directly in the extension of the axis of the speed governor and to combine the switch and the governor into a single unit.

Figure 2:
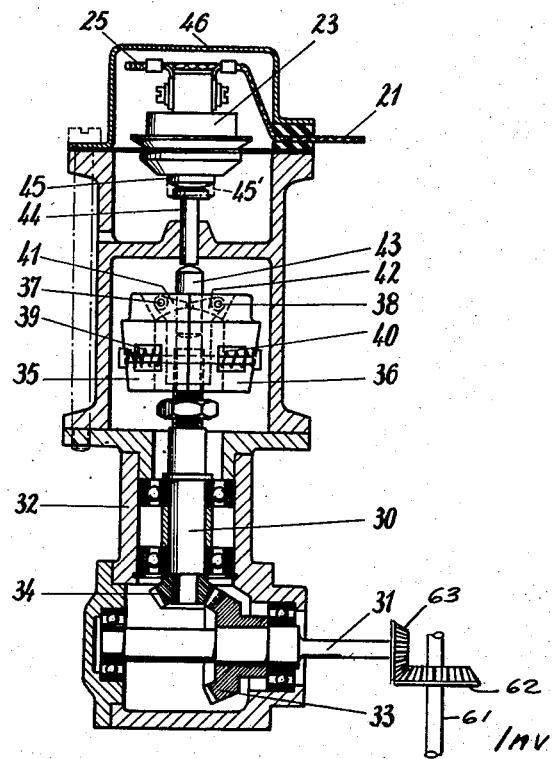

Further objects and advantages of the present invention will become more obvious from the following description when taken in connection with the accompanying drawing which shows for purposes of illustration only one preferred embodiment in accordance with the present invention and wherein:

Figure 1 is a simplified circuit diagram of the control device in accordance with the present invention, and Figure 2 is a cross sectional view of one embodiment of the speed governor and switch unit in accordance with the present invention.

Referring now more particularly to the drawing wherein like reference numerals are used throughout various views to designate like parts, reference numeral 10 designates in Figure 1 a motor, such as an electric motor, which is reversible in its direction of rotation by the alternate energization of its exciting windings 11 and 12. The motor 10, which is used for purposes of effecting the shifting operation into the next higher or lower gear drives, for example, a control cylinder by means of which the individual speed gears of the transmission 55 are engaged, as, for example, by means of shifting levers engaging corresponding control grooves. However, since the step by step shifting mechanism operated by motor 10 forms no part of the present invention, a detailed explanation and showing thereof is believed unnecessary herein and, accordingly, is dispensed with. The transmission 55, as shown schematically in Figure 1, is provided with an input shaft 61 which is coupled to the vehicle engine 51 by means of a suitable clutch 52. The output or driven shaft 56 from the transmission 55 may be connected by any well-known means to the drive wheels of the vehicle.

The exciting windings 11 and 12 of motor 10 are connected to circuits to be more fully described hereinafter, which are appropriately coupled with energizing circuits, energized from the source of electric power indicated by reference numeral 13. An electric line or circuit connects one terminal of the electric source of power 13 to the fulcrum 14 of the manual shift control lever 15 which is shown in full line in the drawing in its neutral position, and which can be selectively adjusted manually either to the left into position 15' for shifting to a higher gear or to the right into position 15" for selecting shifting to a lower gear. In position 15', the lever establishes a connection through contact 16 with an electric circuit 17 leading to a relay 18, which in turn is connected with a circuit 19 leading to the exciting winding 12.

In the position 15" of the lever 15, a circuit is established from source 13 through contact 20, line 21 with a contact 22 of an enclosed switch 23. A circuit 25 which is connected to the other contact 24 of the switch 23 leads to a control relay 26 which effects a connection with an electric circuit 27 which in turn leads to the exciting winding 11 of the reversible motor 10.

In the embodiment shown in the present application, the switching or movable contact member 28 of switch 23 is operated by a centrifugal speed governor 29 which operates in a manner to open the switch 23, thereby opening the circuit between contacts 22 and 24, when the governor weights are deflected outwardly by the centrifugal forces at or above a predetermined speed of shaft 31 formed as intermediate or drive shaft. The circuit between contacts 22 and 24 is closed again by switch 23 when the weights of the governor 29 return to their normal position below a predetermined speed of shaft 31.

As shown in Figure 2, the governor is disposed on a vertical shaft 30, which is driven by the input shaft either directly or through a shaft 31 formed as intermediate shaft. For sake of simplicity, the upward shifting circuit, i.e., the circuit used to shift to the next higher gear, which includes the exciting winding 12, and the downward shifting circuit, i.e. the circuit used to shift to the lower gear, including exciting winding 11, are shown uniformly. However, well known limiting devices, which are not illustrated in the drawing, may be provided so as to cause the motor 10 to be driven only for such length of time as is necessary for shifting up or shifting down one speed gear with each operation of the shifting lever 15.

As long as the speed of the shaft 31 of governor 29 is below a predetermined speed, as for example, 1500 r.p.m., the switching member 28 remains in its raised position so that the switch 23 remains in its position closing the circuit between contacts 22 and 24, thereby enabling a shifting down to a lower gear by setting the lever 15 to the position 15″. When the predetermined speed limit is exceeded sufficiently so as to cause the governor 29 to operate in a manner to move the weights thereof outwardly, the circuit is opened by disengaging the contact member 28 of the switch 23 from the contacts 22 and 24 whereby a shifting down to a lower gear is prevented by reason of the fact that the transmission input shaft is driven in excess of a predetermined speed even when the transmission is disengaged from the engine by declutching and the engine itself runs at a lower speed.

Figure 2 illustrates one preferred embodiment of the present invention wherein reference numeral 31 designates the shaft formed as intermediate or drive shaft for the speed governor which is, for instance, mounted transversely to the transmission input shaft 61. The shaft 31 may be driven from the transmission input shaft 61 by bevel gears 62 and 63, for example, with a gearing-up ratio. The governor housing 32 is arranged to one side of the transmission, and the governor shaft, which is vertically disposed, is driven by shaft 31 through bevel gears 33 and 34 which once more may provide a gearing-up ratio. At the top end of the governor shaft, centrifugal weights 35 and 36 are mounted on fulcrum pins 37 and 38. The helical springs 39 and 40 which cause the return of the weights 35 and 36 are disposed with their axes perpendicular to the governor axis and are selected in such a way so as to permit the weights to be instantaneously deflected outwardly after a fixed predetermined speed limit of the transmission input shaft 61 is succeeded. A pin 43, which is guided axially within governor shaft, is moved in an up and down direction by the lever arms 41 and 42 which extend inwardly of the governor weights. The switching pin 44 and the push button 45 of the electric switch 23 are supported on the pin 43 so as to cause the switch 23 to break the circuit between lines 21 and 25 by permitting the push button 45 to engage its position 45′. The casing 46 for the enclosed electrical switch and the connections therefor is mounted on top of the governor housing so that the governor, the electrical switch and the governor drive form a unitary structure.

What I claim is:

1. An electric control device for preventing the shifting operation from a higher to a lower speed of a change-speed transmission of a motor vehicle which is electrically shifted in steps comprising a manually adjustable control lever, electric circuit means under control of said lever for shifting said change-speed transmission to a lower speed gear including switch means, a transmission input shaft, a clutch for coupling said shaft to an engine of the motor vehicle and speed responsive means driven at a constant ratio from the transmission input shaft for opening said switch means and keeping said switch means opened with the rotational speed of said shaft of said motor vehicle exceeding a predetermined speed.

2. An electric control device according to claim 1, wherein said means for opening said switch means includes a centrifugally operated governor and means for driving said governor from the transmission input shaft operatively connecting said clutch with said transmission.

3. An electric control device according to claim 2, wherein said speed responsive means is arranged on said input shaft.

4. An electric control device according to claim 3, wherein said speed responsive means is operative during all operations of said control lever to effect a lower speed gear.

5. An electric control device according to claim 2, wherein said switch means is located in the extension of the axis of said governor.

6. An electric control device according to claim 5, wherein said electric switch means and said governor form a single unit.

7. An electric control system for controlling gear shifting in the transmission of a motor vehicle, manually adjusted means for selecting the shifting of said transmission, a motor controlled by said means to effect the selected shifting, a transmission input shaft, a centrifugal governor driven by said shaft and in control of said motor to prevent the latter from shifting the transmission from a higher to a lower gear when rotation of said input shaft exceeds a predetermined speed, a transmission driven by said input shaft, a clutch for coupling said input shaft to an engine of the vehicle and means for driving said governor connected to said input shaft between the clutch and the transmission.

8. An electric control system according to claim 7, wherein the centrifugal governor is driven from said input shaft by means of a connecting shaft.

9. An electric control system according to claim 8, including gear means connecting said input shaft and the connecting shaft.

10. An electric control device according to claim 7, wherein the centrifugal governor comprises weights in the form of two cylindrical half-shells which embrace the axis of the governor.

11. An electric control device according to claim 10, including a shaft in the governor for rotating the two half-shells, a pin axially movable within said shaft and levers projecting from said half-shells for moving said pin.

12. An electric control device according to claim 10, including a helical spring for each of the two half-shells for exerting retracting force on the centrifugal weights, the axes of said springs being perpendicular to the governor axis.

13. An electric control system for controlling gear shifting in the transmission of a motor vehicle, manually adjusted means for selecting the shifting of said transmission, a motor controlled by said means to effect the selected shifting, said manually adjustable means being movable to one position for conditioning said motor to shift said change-speed transmission only from a higher to a lower gear, a transmission input shaft, a centrifugal governor driven by said shaft and in control of said motor to prevent the latter from shifting the transmission from a higher to a lower gear when rotation of said input shaft exceeds a predetermined speed when said manually adjustable means is in said one position, said manually adjusted means and said centrifugal governor both being at all times in control for each shifting operation from a higher to a lower gear, said manually adjustable means being movable to a second position for controlling said motor independently of said governor to shift said transmission from a lower to a higher gear.

References Cited in the file of this patent

UNITED STATES PATENTS

| | | |
|---|---|---|
| 860,972 | Gibbs | July 23, 1907 |
| 1,162,047 | Freeman | Nov. 30, 1915 |
| 2,043,783 | Tyler | June 9, 1936 |
| 2,051,553 | Fleischel | Aug. 18, 1936 |
| 2,091,468 | Carter | Aug. 31, 1937 |
| 2,225,493 | Barnes | Dec. 17, 1940 |
| 2,236,746 | Bush | Apr. 1, 1941 |
| 2,373,453 | Brunken | Apr. 10, 1945 |
| 2,440,558 | Price | Apr. 27, 1948 |
| 2,563,925 | Dederick | Aug. 14, 1951 |
| 2,616,304 | Long | Nov. 4, 1952 |
| 2,683,995 | Leiker | July 20, 1954 |